(12) United States Patent
Jun et al.

(10) Patent No.: US 6,412,750 B1
(45) Date of Patent: Jul. 2, 2002

(54) VALVE SYSTEM FOR FLUID PIPES

(75) Inventors: Duck Jo Jun; Yung Gee Do, both of Kyungkido (KR)

(73) Assignee: Se Woo Conval Co., Ltd., Kyungkido (KR)

( * ) Notice: Subject to any disclaimer, the term of this patent is extended or adjusted under 35 U.S.C. 154(b) by 0 days.

(21) Appl. No.: 09/743,711
(22) PCT Filed: Jul. 15, 1999
(86) PCT No.: PCT/KR99/00376
§ 371 (c)(1), (2), (4) Date: Jan. 16, 2001
(87) PCT Pub. No.: WO00/04311
PCT Pub. Date: Jan. 27, 2000

(30) Foreign Application Priority Data

Jul. 16, 1998 (KR) ............................................. 98-28934
Jan. 30, 1999 (KR) .............................................. 99-3170

(51) Int. Cl.⁷ ........................... F16K 31/44; F16K 31/02
(52) U.S. Cl. ...................... 251/14; 251/77; 251/129.11; 251/251; 251/259; 251/279
(58) Field of Search ......................... 251/14, 77, 129.11, 251/251, 259, 260, 261, 279

(56) References Cited

U.S. PATENT DOCUMENTS

| 2,130,614 A | | 9/1938 | Collins et al. |
| 2,833,508 A | | 5/1958 | Bydalek et al. |
| 3,556,143 A | * | 1/1971 | Nally ......................... 137/589 |
| 3,817,284 A | * | 6/1974 | Daugherty ............. 137/614.13 |
| 4,508,142 A | * | 4/1985 | Eburn et al. ............. 137/625.4 |
| 4,573,494 A | * | 3/1986 | Spurbeck .................... 137/331 |
| 5,309,934 A | * | 5/1994 | Jaeger ............................ 137/1 |
| 5,975,491 A | * | 11/1999 | Mann ..................... 137/614.05 |

FOREIGN PATENT DOCUMENTS

| DE | 1162996 | 9/1969 |
| FR | 1312087 | 11/1961 |
| FR | 1324371 | 3/1963 |
| FR | 2255523 | 7/1975 |

* cited by examiner

Primary Examiner—William C. Doerrler
Assistant Examiner—David A Bonderer
(74) Attorney, Agent, or Firm—Lowe Hauptman Gilman & Berner, LLP (57) ABSTRACT

A valve system for fluid pipes is disclosed. This valve system is designed to be operable using pneumatic pressure or using another means, such as a valve control lever or fluid pressure, in place of pneumatic pressure and is designed to be controlled easily and precisely. The valve body (20) is thus movable within the passage (13) while minimizing frictional force between the valve body and the valve housing (10). The valve control lever (50) is operated in conjunction with the annular guide groove (24) formed on the circumferential external surface of the pressure actuated flange (25) of the valve body (20). In such a case, the linear moving direction and moving distance of the valve body is determined by the rotating direction and rotating angle of the lever (50). The valve system of this invention also has a rotor (40) used for centrifugally forcing the fluid introduced into the passage. A fluid guide rod (45) axially extends along the center of the passage, thus guiding the flow of fluid. A fluid guide member (33), having a variety of fluid guide surfaces, is assembled with a disc (30). The valve system thus allows fluid to more quickly and smoothly pass through the valve system. The valve body is also movably and concentrically supported by a plurality of spring-biased valve support units (26).

6 Claims, 12 Drawing Sheets

VALVE SYSTEM FOR FLUID PIPES

TECHNICAL FIELD

The present invention relates, in general, to a valve system for fluid pipes and, more particularly, to an improvement in such a valve system to allow the system to be operable using pneumatic pressure or using another means in place of pneumatic pressure and to be controlled easily and precisely, and to quickly and smoothly feed fluid, thus improving operational reliability of the system.

BACKGROUND ART

As well known to those skilled in the art, a fluid pipe, used for feeding fluid, is provided with one or more valve systems for controlling the flow of fluid passing through the pipe.

Figure 1:
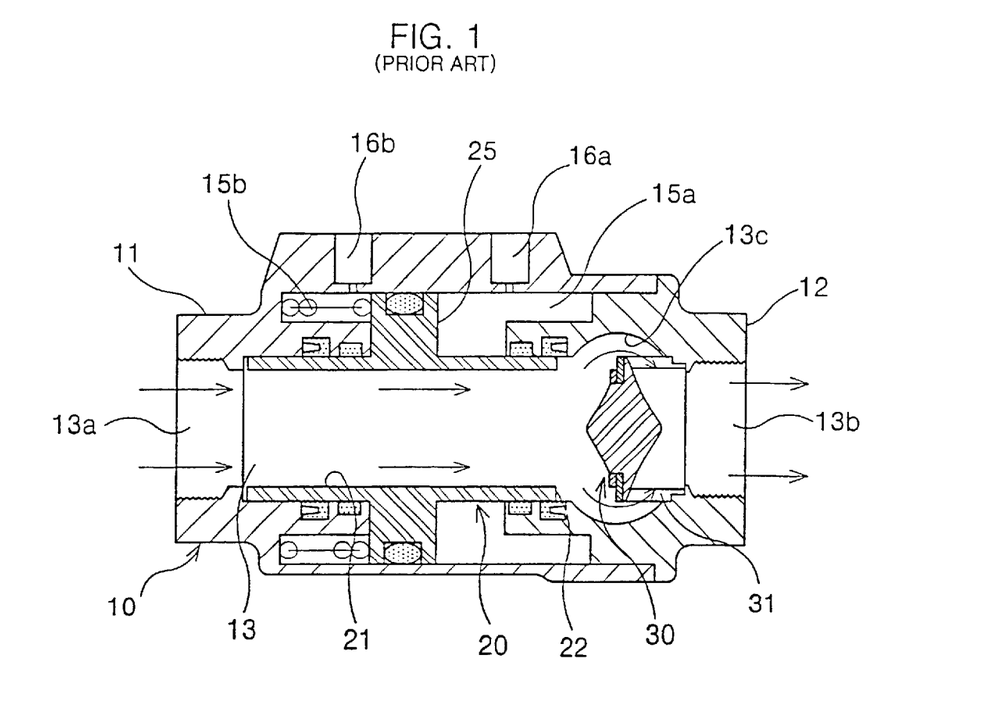
Figure 2:
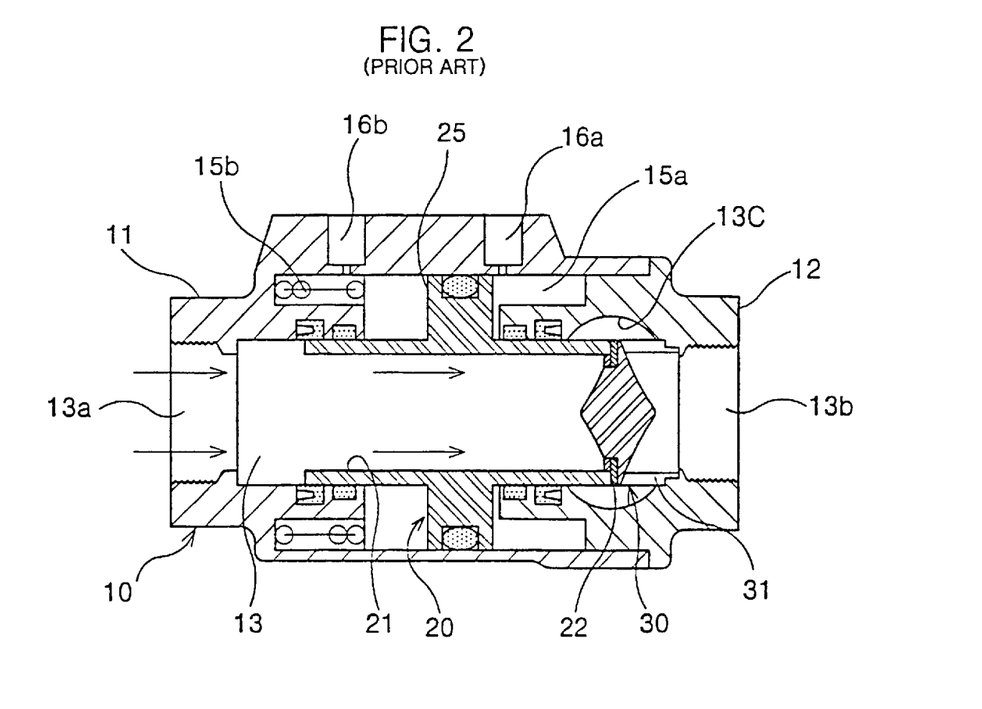

FIGS. 1 and 2 show the construction and operation of a conventional pneumatic valve system for fluid pipes. As shown in the drawings, the conventional valve system comprises two bodies: first and second bodies 11 and 12 assembled into a single valve housing 10. An internal fluid passage 13 is longitudinally formed along the central axis of the valve housing 10 with inlet and outlet openings 13a and 13b being provided at both ends of the passage 13. In such a case, the inlet opening 13a is formed in the first body 11, while the outlet opening 13b is formed in the second body 12. An annular guide groove 13c, having a concave surface, is formed on the passage 13 at a position inside the outlet opening 13b.

A cylindrical valve body 20, having an axial fluid passing opening 21, is axially and movably fitted in the passage 13 in a way such that the valve body 20 is reciprocable within a predetermined range in the axial direction of the valve housing 10. The above valve body 20 selectively closes the passage 13 at the first end 22 thereof when the valve body 20 is fully moved to the right in the drawings. That is, the first end 22 of the valve body 20 acts as a passage control means for opening or closing the passage 13 of the valve system. A flanged cylindrical disc 30, having two fluid passing holes 31 on its sidewall, is fixedly installed in the passage 13 at a position within the guide groove 13c. The reciprocable valve body 20 selectively comes into close contact with the flange of the disc 30 at the first end 22 when the valve body 20 is fully moved to the right in the drawings, thus closing the passage 13.

An annular pressure actuated flange 25 is exteriorly and fixedly formed on the valve body 20. The above flange 25 formes first and second air pressure chambers 15a and 15b within the valve housing 10 at opposite sides thereof while sealing the junction between the two variable chambers 15a and 15b. The first chamber 15a is provided with a first air injection port 16a, through which pneumatic pressure, or external air pressure, is injected into the chamber 15a so as to open the passage 13. The second chamber 15b is provided with a second air injection port 16b, through which external air pressure is injected into the chamber 15b so as to close the passage 13.

A fluid flow control operation of the above valve system will be described hereinbelow.

In order to open the passage 13 of the valve system, external air pressure is injected into the first chamber 15a through the port 16a, thus acting on the right-side surface of the pressure actuated flange 25. The valve body 20 is thus moved toward the fluid inlet opening 13a, and so the first end 22 of the valve body 20 is spaced apart from the disc 30. Therefore, the internal fluid passage 13 of the system is opened as shown in FIG. 1.

When the passage 13 is opened as described above, fluid, introduced into the passage 13 through the inlet opening 13a, flows into the groove 13c through the gap between the valve body 20 and the disc 30. The fluid, thereafter, passes through the fluid passing holes 31 of the disc 30 prior to being discharged from the passage 13 through the outlet opening 13b.

When it is necessary to close the passage 13 of the valve system, external air pressure is injected into the second chamber 15b through the port 16b, thus acting on the left-side surface of the flange 25. The valve body 20 is thus moved toward the fluid outlet opening 13b, and so the first end 22 of the valve body 20 comes into close contact with the disc 30. Therefore, the internal fluid passage 13 of the system is completely closed as shown in FIG. 2.

When the passage 13 is closed as described above, fluid, introduced into the passage 13 through the inlet opening 13a, is prevented from flowing into the groove 13c. It is thus impossible for the fluid to be discharged from the passage 13 of the valve system into a pipe through the outlet opening 13b.

However, the above valve system is problematic in that the valve body 20 is designed to be only pneumatically operated, thus failing to be precisely controlled. It is thus impossible to precisely control the opening of the valve body 20.

The above valve system is not provided with any separate means for controlling the valve body 20, the means being selectively used for actuating the valve body 20 in an emergency case wherein it is impossible to get air pressure. This reduces the operational reliability and market competitiveness of the valve system.

In addition, the valve body 20 is brought into frictional contact with the interior surface of the passage 13 during a reciprocating action thereof. Therefore, it is difficult for the valve body 20 to smoothly move within the passage 13, and so the valve body 20 may fail to accomplish a desired operation. This problem becomes worse when the air pressure, acting on the flange 25 of the valve body 20, is less than a reference level.

Another problem, experienced in the above valve system, is caused by a difference in flow rates between fluid currents within the passage 13. That is, the outside fluid current, flowing along the interior surface of the passage 13, may be easily and smoothly introduced into the guide groove 13c at a relatively high speed. However, the central fluid current, flowing along the axis of the passage 13, may be not easily or smoothly introduced into the groove 13c. This is caused by the fact that there occurs a friction between the central fluid current and the disc 30 and the central fluid current has to be moved from the central portion of the passage 13 to the guide groove 13c. Therefore, the flow rates of the fluid currents are different from each other. Due to such a flow rate difference, it is almost impossible for the fluid to quickly or smoothly flow in the passage 13.

DISCLOSURE OF THE INVENTION

Accordingly, the present invention has been made keeping in mind the above problems occurring in the prior art, and an object of the present invention is to provide a valve system for fluid pipes, which is designed to be operable using pneumatic pressure or using another means in place of pneumatic pressure and is designed to be controlled easily and precisely.

Another object of the present invention is to provide a valve system for fluid pipes, which effectively reduces the frictional force between relatively moved parts during an operation of the system, thus being allowed to be easily and smoothly operated.

A further object of the present invention is to provide a valve system for fluid pipes, which allows fluid to smoothly and quickly pass through the system.

In order to accomplish the above objects, the present invention provides a valve system having the following construction. Both a disc and a reciprocable valve body are provided within the internal fluid passage of a valve housing, with fluid inlet and outlet openings being formed at both ends of the passage. The valve body is designed to be normally and pneumatically operated using air pressure injected into either one of two chambers, provided at both sides of the pressure actuated flange of the valve body, through first or second injection port of the valve housing in the same manner as that of the prior art. The valve body thus comes into close contact with the disc or is moved away from the disc by air pressure so as to close or open the passage. The valve system of this invention further comprises a rotor used for centrifugally forcing the fluid as it is introduced into the passage. A fluid guide rod axially extends along the center of the passage, thus guiding the flow of fluid. The disc also has a fluid guide member, which may have a variety of fluid guide surfaces. The fluid is thus allowed to more quickly and smoothly pass through the valve system.

In addition, the valve body is movably and concentrically supported by a plurality of spring-biased valve support units. The valve body is thus movable within the passage while minimizing frictional force between the valve body and the valve housing.

The valve system of this invention also has a valve control means for selectively moving the valve body toward the fluid inlet or fluid outlet opening of the passage so as to open or close the passage, without using air pressure, when necessary.

In an embodiment, the valve control means comprises a valve control lever operated in conjunction with an annular guide groove formed on the circumferential external surface of the pressure actuated flange of the valve body. In such a case, the linear moving direction and moving distance of the valve body is determined by the rotating direction and rotating angle of the lever. In another embodiment, the valve control means is designed to operate the valve body using fluid, passing through the valve system, in place of pneumatic pressure.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 are longitudinal-sectioned views of a conventional pneumatic valve system for fluid pipes, showing an operation of the system, in which:

FIG. 1 shows the system in an open position; and

FIG. 2 shows the system in a closed position;

FIGS. 3 and 4 are longitudinal-sectioned views of a valve system for fluid pipes in accordance with the primary embodiment of this invention, showing an operation of the system, in which:

FIG. 3 shows the system in an open position; and

FIG. 4 shows the system in a closed position;

FIGS. 13a and 13b are longitudinal-sectioned views of a valve system for fluid pipes in accordance with the fifth embodiment of this invention, showing an operation of the system, in which:

FIG. 13a shows the system in an open position; and

FIG. 13b shows the system in a closed position;

BEST MODE FOR CARRYING OUT THE INVENTION

Figure 3:
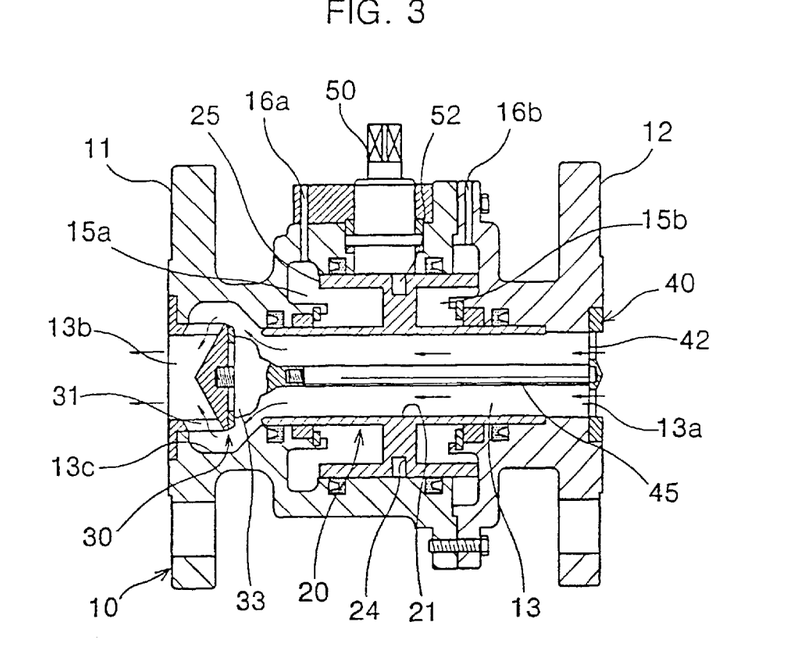
Figure 4:
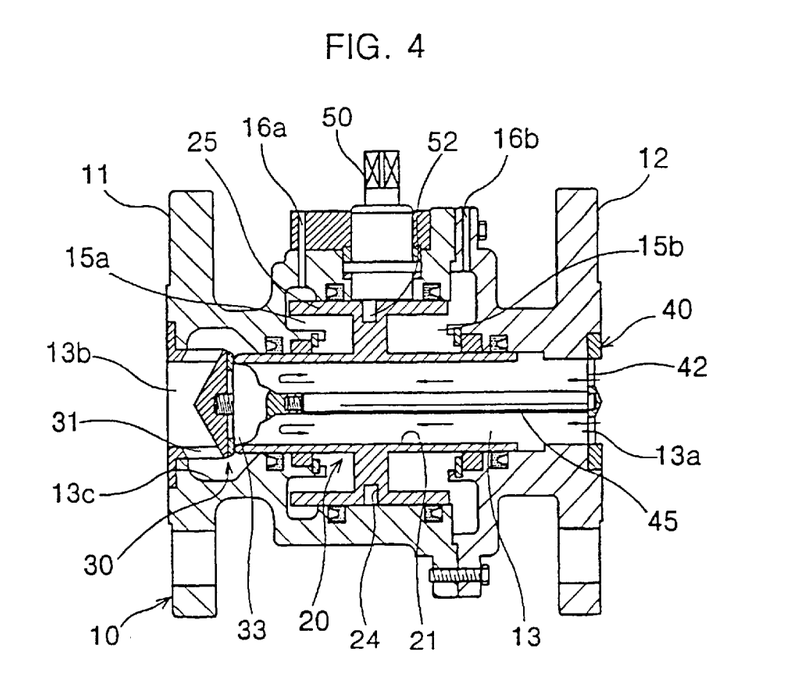
Figure 5:
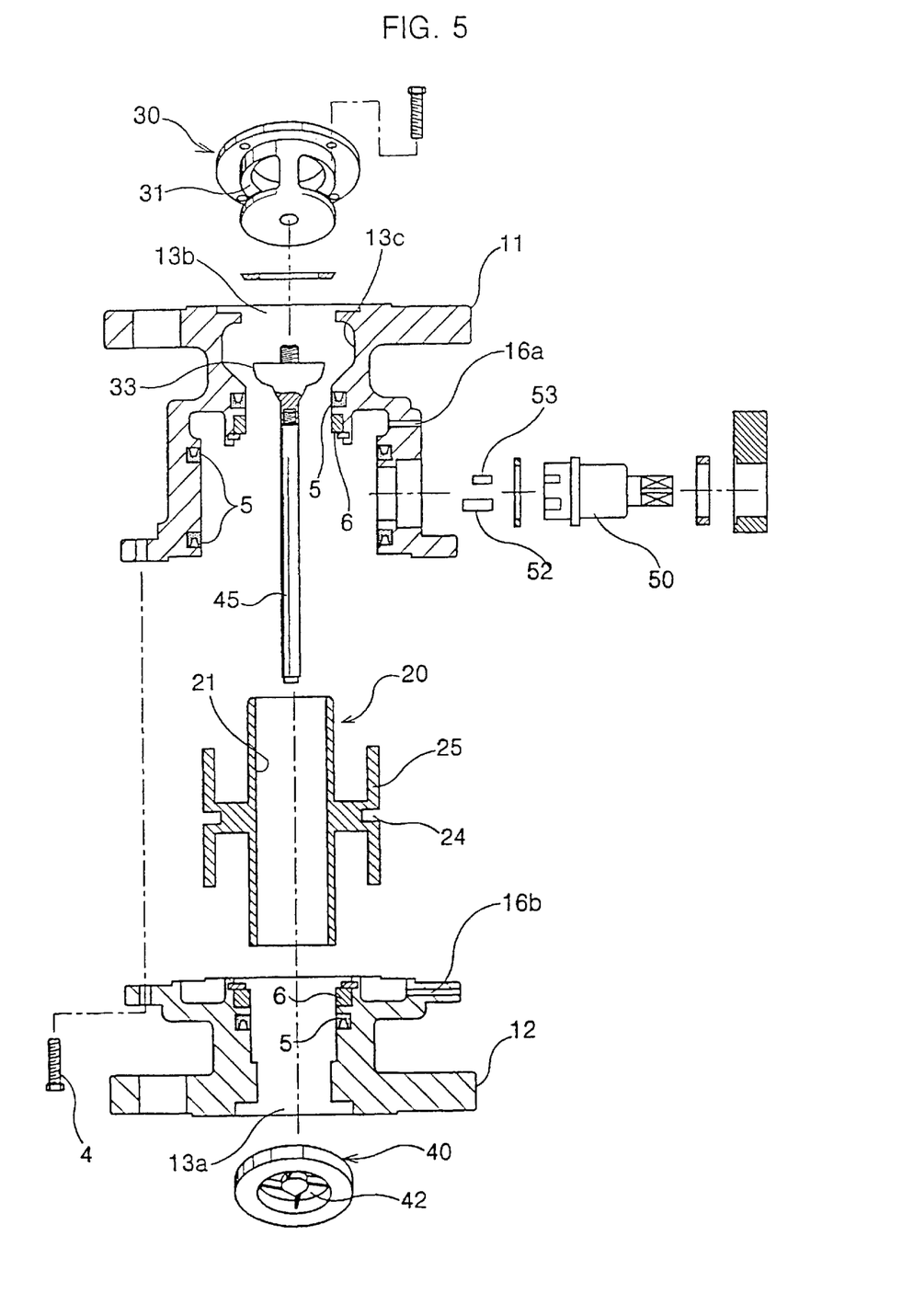
FIG. 5 is an exploded sectional view of the valve system of FIGS. 3 and 4.

FIGS. 3 and 4 show a valve system for fluid pipes in accordance with the primary embodiment of this invention.

As shown in the drawings, the valve system of this invention comprises two bodies: first and second bodies 11 and 12 assembled into a single valve housing 10. An internal fluid passage 13 is longitudinally formed along the central axis of the valve housing 10 with inlet and outlet openings 13a and 13b being provided at both ends of the passage 13. In the valve system of this invention, the inlet opening 13a is formed in the second body 12, while the outlet opening 13b is formed in the first body 11. An annular guide groove 13c, having a concave surface, is formed on the passage 13 at a position inside the outlet opening 13b.

A cylindrical valve body 20, having an axial fluid passing opening 21, is axially and movably fitted in the passage 13 in a way such that the valve body 20 is reciprocable within a predetermined range in the axial direction of the valve housing 10. The above valve body 20 is moved to the left or right in the passage 13 by external air pressure acting on either side of the pressure actuated flange 25 of the valve body 20. The external air pressure is introduced into either one of two air chambers 15a and 15b, formed in the valve housing 10 at both sides of the flange 25, through first and second air injection ports 16a and 16b. A flanged cylindrical disc 30, having two fluid passing holes 31 on its sidewall, is fixedly installed in the passage 13 at a position within the guide groove 13c. When the valve body 20 is fully moved to the left in the drawings, the valve body 20 selectively comes into contact with the disc 30 at an end thereof and closes the passage 13 of the valve system. On the other hand, when the valve body 20 moves away from the disc 30, the valve body 20 opens the passage 13.

In the valve system of this invention, a rotor 40, having a plurality of vanes 42, is provided in the passage 13 within the fluid inlet opening 13a. A fluid guide rod 45 axially extends in the passage 13 from the rotor 40 to the disc 30.

The air pressure actuated flange 25 of the valve body 20 has an annular guide groove 24 on its circumferential external surface. A valve control means, selectively used for manually moving the valve body 20 in place of using the pneumatic pressure, is provided on the valve system. In the primary embodiment, the valve control means comprises a valve control lever 50 which is radially mounted to the sidewall of the first body 11. A valve control bolt 52 is axially mounted to the inside end of the lever 50 at an eccentric position. When the lever 50 is set in the valve housing 10, the control bolt movably engages with the annular guide groove 24 of the flange 25. The control bolt 52 linearly moves the valve body 20 in either direction when the lever 50 is manually rotated. In such a case, the moving direction of the valve body 20 is determined by the rotating direction of the lever 50, while the moving distance of the valve body 20 is determined by the rotating angle of the lever 50.

A lever support bolt 53, having a length shorter than that of the control bolt 52, is mounted to the inside end of the lever 50 at a position adjacent to the control bolt 52. The lever support bolt 53 is always brought into slidable contact with the external surface of the flange 25 at its end, thus preventing the lever 50 from being undesirably moved during a rotating action of the lever 50.

Figure 7:
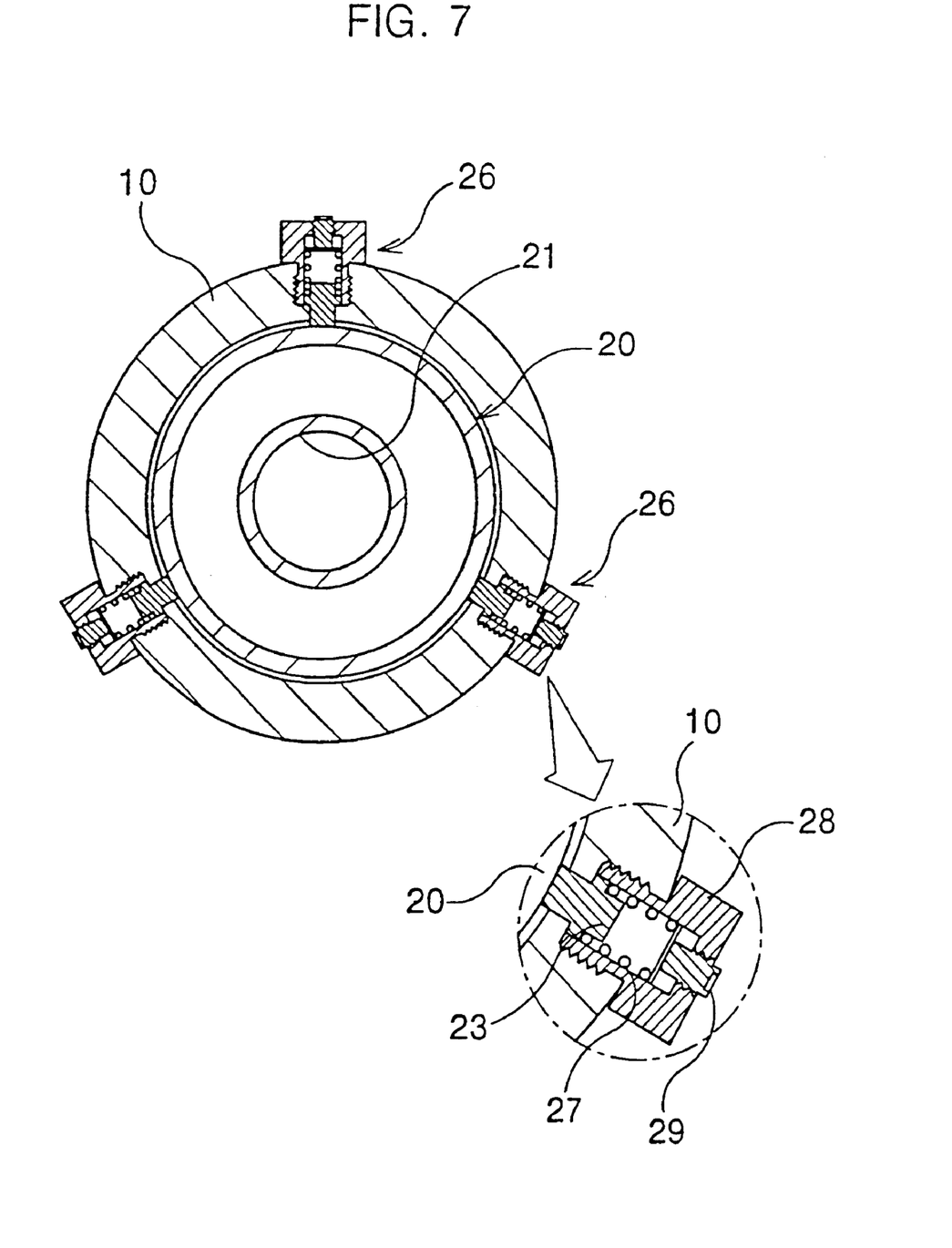
FIG. 7 is a cross-sectioned view of the valve system of FIGS. 3 and 4, showing a valve support means of the system in more detail.

FIG. 7 is a cross-sectioned view of the above valve system, showing a valve support means of the system in more detail. As shown in the drawing, the valve support means comprises a plurality of spring-biased support units 26 provided on the valve housing 10 at regularly and angularly spaced positions. Each of the support units 26 comprises a hollow bolt-shaped casing 28. The casing 28, individually having an adjusting bolt 29 at an outside end wall, is radially threaded into the sidewall of the valve housing 10 from the outside of the valve housing 10. A plurality of valve support plugs 23 are individually received in the opening of each casing 28. Each plug 23 is normally biased by a compression coil spring 27 toward the external surface of the valve body 20. The spring-biased plugs 23 thus support the valve body 20 while allowing the valve body 20 to be movable within the valve housing 10 relative to the plugs 23. Due to the valve support units 26, the valve body 20 is concentrically positioned within the valve housing 10 while forming a gap between the valve housing 10 and the valve body 20. In each of the valve support units 26, it is possible to adjust the spring force of the compression coil spring 27 as desired by operating the adjusting bolt 29.

Figure 8A:
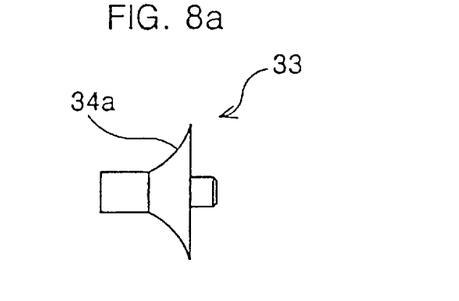
FIGS. 8a to 8d are views, respectively showing the profile of four fluid guide members for discs in accordance with first to fourth modifications of the primary embodiment of this invention.
Figure 8B:
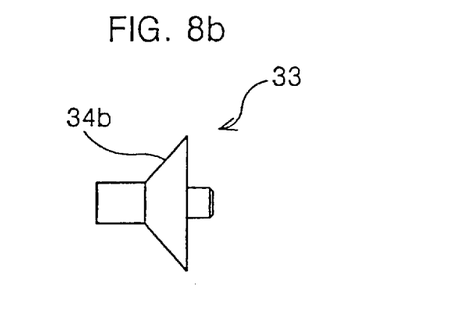
Figure 8C:
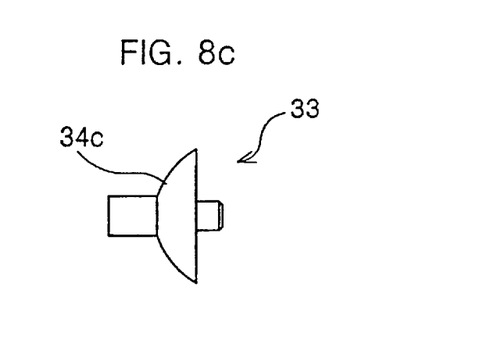
Figure 8D:
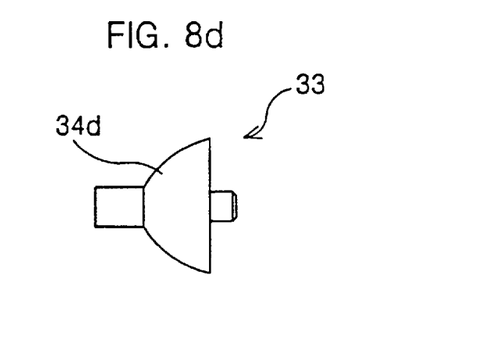

A specifically designed fluid guide member 33 is provided on the disc 30 at a fluid receiving end portion of the disc 30. In the present invention, the fluid guide member 33 may be cast with the disc 30 into a single structure. Alternatively, the member 33 and the disc 30 may be separately formed prior to being assembled into a single body. In accordance with the first to fourth modifications of the primary embodiment of this invention, the fluid guide member 33 may have a concave guide surface 34a as shown in FIG. 8a, a flat guide surface 34b as shown in FIG. 8b, or a convex guide surface 34c or 34d as shown in FIG. 8c or 8d.

A Teflon coat layer is preferably formed on the fluid contact surfaces of the inside wall of the passage 13, the valve body 20 and the disc 30, thus effectively preventing the fluid contact surfaces from being undesirably oxidized.

In the drawings, the reference numeral 4 denotes a locking member, 5 denotes a packing member, and 6 denotes a Teflon ring.

A fluid flow control operation of the above valve system will be described hereinbelow.

In order to open the passage 13 of the valve system, an external air pressure is injected into the first chamber 15a through the port 16a, thus acting on the left-side surface of the pressure actuated flange 25. The valve body 20 is thus moved toward the fluid inlet opening 13a as shown in FIG. 3. In such a case, the cylindrical valve body 20 is movably supported by the spring-biased plugs 23 of the valve support units 26 while being spaced apart from the interior wall of the valve housing 10 as shown in FIG. 7. Therefore, it is possible to pneumatically and smoothly move the valve body 20 while minimizing the frictional force between the valve body 20 and the valve housing 10.

In each of the valve support units 26, the spring force of the compression coil spring 27 may be easily controlled as desired by operating the adjusting bolt 29. Therefore, it is possible to control the valve supporting force of the units 26. The sensitivity of the valve body 20 to the pneumatic pressure is thus easily and precisely controlled.

That is, when the spring force of the compression coil springs 27 is adjusted to be less than a reference level, the valve body 20 becomes more sensitive to the pneumatic pressure acting on the flange 25. In such a case, the valve body 20 will be more smoothly moved a greater distance than in the case of a higher spring force.

When the valve body 20 is moved toward the fluid inlet opening 13a as described above, the first end 22 of the valve body 20 is spaced apart from the disc 30. The internal fluid passage 13 of the system is thus opened.

When the passage 13 is opened as described above, fluid, introduced into the passage 13 through the inlet opening 13a, flows into the groove 13c through the gap between the valve body 20 and the disc 30. The fluid, thereafter, passes through the fluid passing holes 31 of the disc 30 prior to being discharged from the passage 13 through the outlet opening 13b.

When the fluid is introduced into the passage 13 through the inlet opening 13a, the fluid passes through the vanes 42 of the rotor 40, thus being centrifugally forced and being biased outwardly in a radial direction. In addition, the central fluid current is guided to the interior wall of the passage 13 by the fluid guide rod 45. The fluid thus smoothly and quickly passes through the passage 13.

At the fluid receiving end portion of the disc 30, the fluid flows over the fluid guide surface of the guide member 33. The frictional resistance, exerted to the fluid by the disc 30, is minimized. This allows the fluid to more smoothly and quickly flow into the groove 13c.

Therefore, fluid, introduced into the passage 13 through the inlet opening 13a, is more smoothly and quickly discharged from the passage 13 through the outlet opening 13b due to the rotor 40, the fluid guide rod 45 and the fluid guide member 33 of the disc 30.

Figure 9:
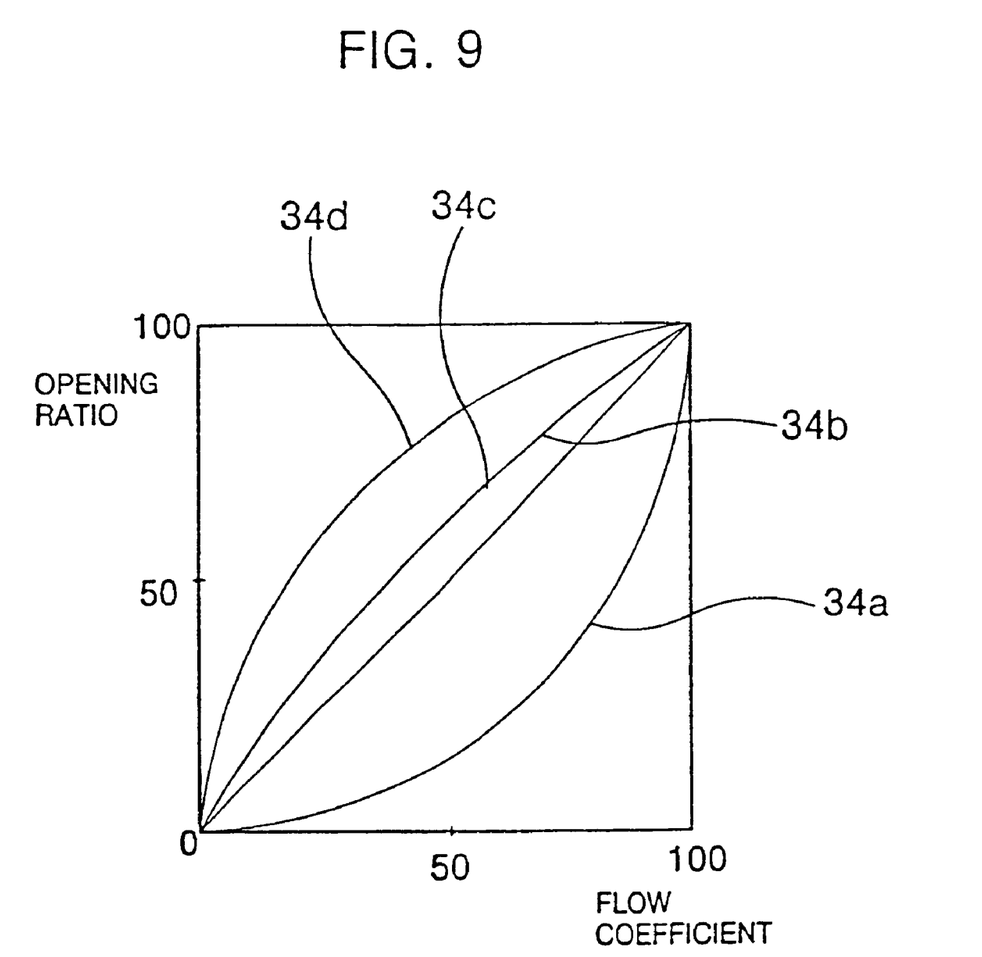
FIG. 9 is a graph, showing the flow coefficient as a function of the opening ratios of four discs, respectively having the four fluid guide members of FIGS. 8a to 8d.

The profile of the fluid guide member 33 may be somewhat freely selected from the concave guide surface 34a of FIG. 8a, the flat guide surface 34b of FIG. 8b and the convex guide surfaces 34c and 34d of FIGS. 8c and 8d in accordance with a desired flow capacity of the valve system. FIG. 9 is a graph, showing the flow coefficient as a function of the opening ratios of four discs, respectively having the four fluid guide members with the surfaces 34a, 34b, 34d and 34e.

As shown in the graph of FIG. 9, in the case of a disc 30 having an opening ratio of 50%, the concave surface 34a achieves a flow coefficient of about 80%. In the case of the same opening ratio of the disc 30, the flat surface 34b and the convex surfaces 34c and 34d achieve flow coefficients of about 50%, 35% and 20%, respectively. Therefore, it is noted that the flow rate of the valve system is greater increased in the member 33 with a convex surface than the member 33 with a concave surface. This data is preferably used in a design of the valve system.

When it is necessary to close the passage 13 of the valve system, external air pressure is injected into the second chamber 15b through the port 16b, thus acting on the right-side surface of the flange 25. The valve body 20 is thus moved toward the fluid outlet opening 13b as shown in FIG. 4.

In such a case, the valve body 20 is more smoothly and stably moved with the frictional force between the valve body 20 and the valve housing 10 being minimized due to the valve support unit 26 in the same manner as that described for the valve opening action.

When the valve body 20 is moved toward the fluid outlet opening 13b, the first end 22 of the valve body 20 comes into close contact with the disc 30. The internal fluid passage 13 of the system is thus completely closed by the valve body 20.

When the passage 13 is closed as described above, fluid, introduced into the passage 13 through the inlet opening 13a, is prevented from flowing into the groove 13c. It is thus impossible for the fluid to be discharged from the passage 13 into a pipe through the outlet opening 13b.

Figure 6A:
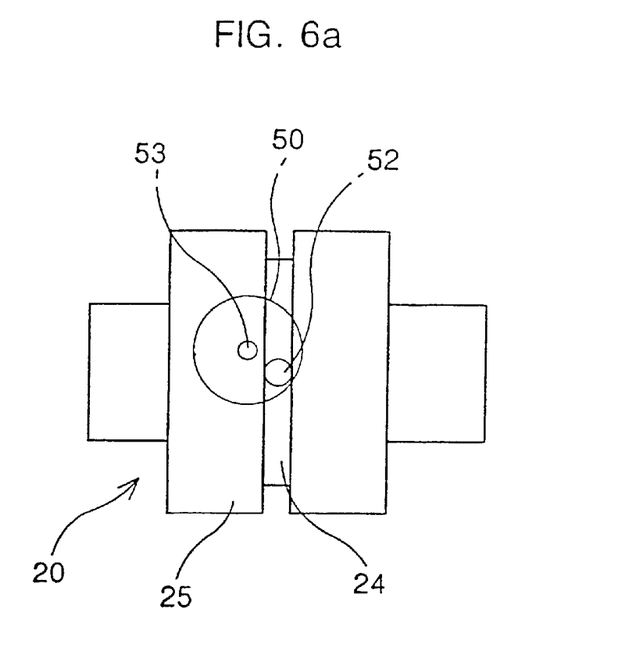
FIGS. 6a and 6b are plan views, showing an operation of a valve control lever used as a valve control means in the valve system of FIGS. 3 and 4.
Figure 6B:
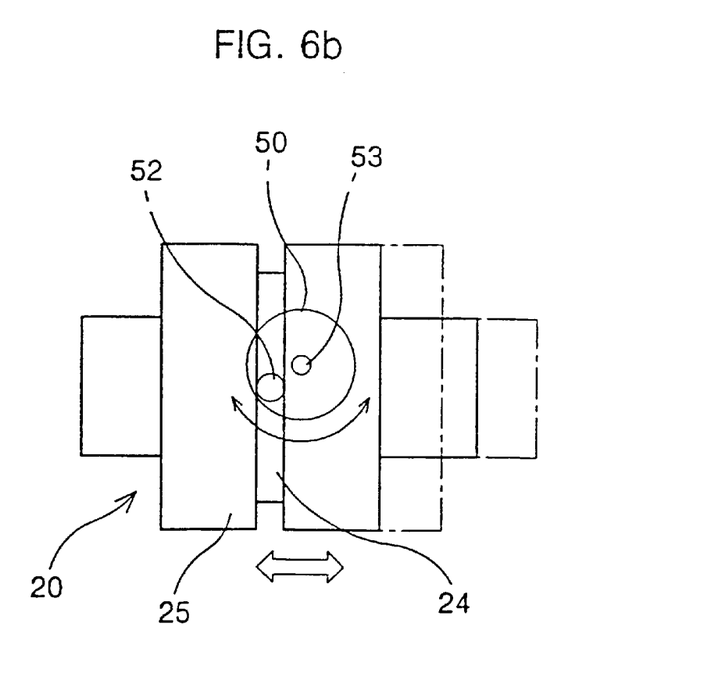

When it is necessary to precisely control the valve body 20 or it is impossible to obtain external air pressure for the valve system, the valve body 20 is manually controlled by the valve control lever 50 as shown in FIGS. 6a and 6b.

In a detailed description, when the lever 50 is rotated in a direction opening or closing the passage 13 of the valve system, the valve control bolt 52 is rotated in the same direction.

In such a case, the valve control bolt 52 is rotated under the guide of the annular guide groove 24 of the valve body 20, thus linearly moving the valve body 20 in desired direction. That is, the valve body 20 is moved toward the inlet opening 13a or the outlet opening 13b, thus opening or closing the passage 13.

During such a rotating action of the valve control lever 50, the linear moving distance of the valve body 20 within the passage 13 is precisely controlled by the rotating angle of the valve control bolt 52. Therefore, it is possible to precisely control the opening ratio of the gap between the disc 30 and the first end 22 of the valve body 20 by controlling the rotating angle of the lever 50. This allows the fluid flow rate of the valve system to be precisely controlled.

The lever support bolt 53, mounted to the inside end of the lever 50 at a position adjacent to the control bolt 52, is always brought into slidable contact with the external surface of the flange 25 at its end. The lever 50 is thus almost completely prevented from being undesirably moved during a rotating action of the lever 50. It is, therefore, possible to precisely and stably operate the lever 50.

In the present invention, the above lever 50 may be designed to be manually operated with the same structure as that of a conventional manual lever or a conventional overdrive hand wheel. However, when it is necessary to more precisely control the lever 50, the lever 50 may be designed to use a conventional positioner, a conventional limit switch or a conventional proximity sensor.

Figure 10A:
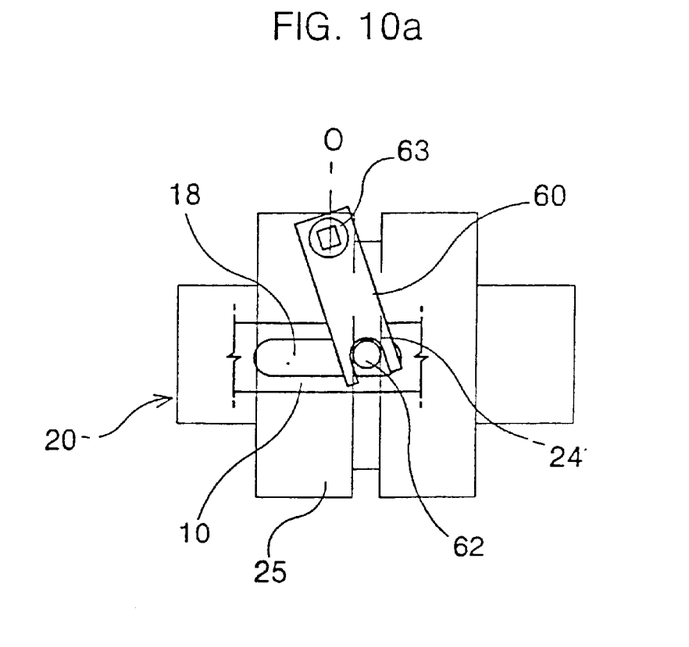
FIGS. 10a and 10b are plan views, showing an operation of a valve control means in accordance with the second embodiment of the present invention.
Figure 10B:
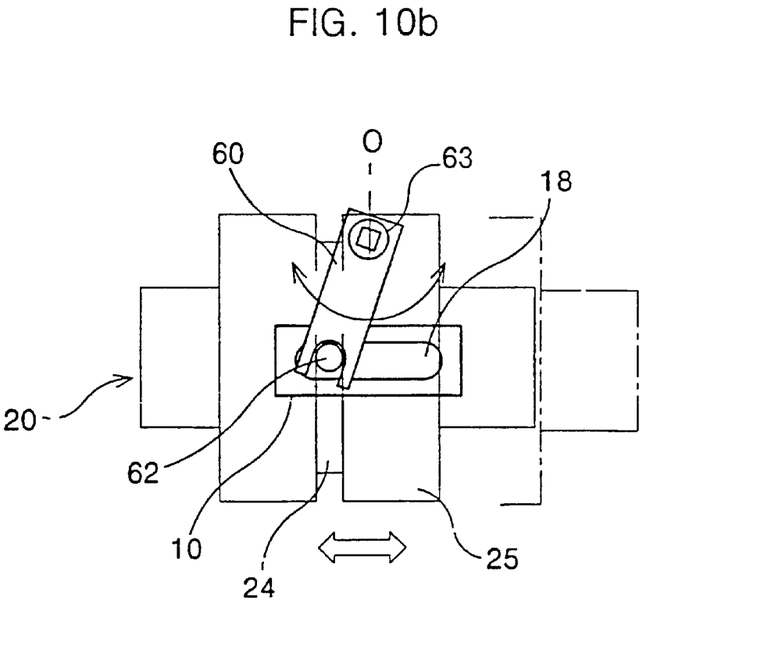
Figure 11:
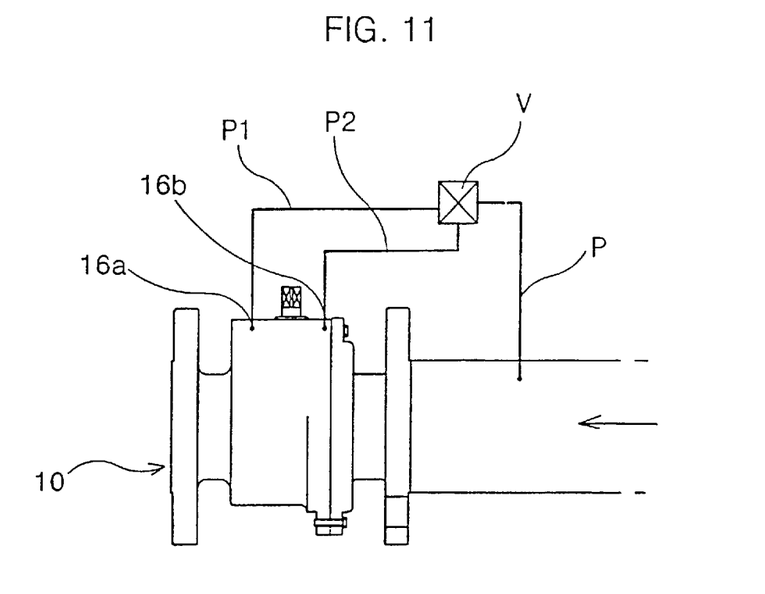
FIG. 11 is a plan view, showing an operation of a valve control means in accordance with the third embodiment of the present invention.

FIGS. 10a and 10b are plan views, showing an operation of a valve control means in accordance with the second embodiment of this invention. FIG. 11 is a plan view, showing an operation of a valve control means in accordance with the third embodiment of this invention.

In the second embodiment of FIGS. 10a and 10b, the valve control means comprises a longitudinal guide opening 18 that is axially formed on the sidewall of the valve housing 10. A valve control bolt 62 is movably inserted into the guide opening 18 until the bolt 62 slidably engages with the annular guide groove 24 of the valve body 20. The control bolt 62 is also hinged to one end of a valve control lever 60, of which the other end is fixed to a rotating shaft 63. The valve control lever 60 is thus rotatable by the rotating shaft 63 in opposite directions so as to open or close the passage 13 of the valve system. That is, when the lever 60 is rotated in a direction by the shaft 63, the valve control bolt 62 is linearly moved in the same direction under the guide of the longitudinal opening 18 while linearly moving the valve body 20 in the same direction. The valve body 20 thus opens or closes the passage 13.

During such a rotating action of the valve control lever 60, the linear moving distance of the valve body 20 within the passage 13 is precisely controlled by the rotating angle of the lever 60. Therefore, it is possible to precisely control the opening ratio of the gap between the disc 30 and the first end 22 of the valve body 20 by controlling the rotating angle of the lever 60. This allows the fluid flow rate of the valve system to be precisely controlled.

In the third embodiment of FIG. 11, the valve control means is designed to operate the valve body 20 using fluid, passing through the valve system, in place of pneumatic pressure or the above-mentioned levers 50 and 60.

In a detailed description, two fluid pressure lines P1 and P2 are coupled to the first and second air injection ports 16a and 16b of the valve. housing 10, respectively. The first and second pressure lines P1 are commonly connected to the main pressure line P through a three-way valve V. The main pressure line P extends to the fluid inlet opening 13a of the valve housing 10. When it is necessary to open the passage 13, the threeway valve V opens the first pressure line P1, thus injecting fluid from the line P into the chamber 15a through the port 16a. The valve body 20 is thus moved in a direction opening the passage 13.

When it is necessary to close the passage 13, the three-way valve V opens the second pressure line P2, thus injecting fluid from the line P into the chamber 15b through the port 16b. The valve body 20 is thus moved in a direction closing the passage 13. The valve control means of FIG. 11 more simply moves the valve body 20 using the fluid of the pipes without using any separate pressure or,any separate mechanism.

In addition, the fluid pressure more effectively and smoothly controls the valve body 20 than in the case of using pneumatic pressure, and so the valve control means of FIG. 11 more precisely controls the valve body 20.

FIGS. 12 to 15 show valve systems for fluid pipes in accordance with the fourth and fifth embodiments of this invention.

Figure 12:
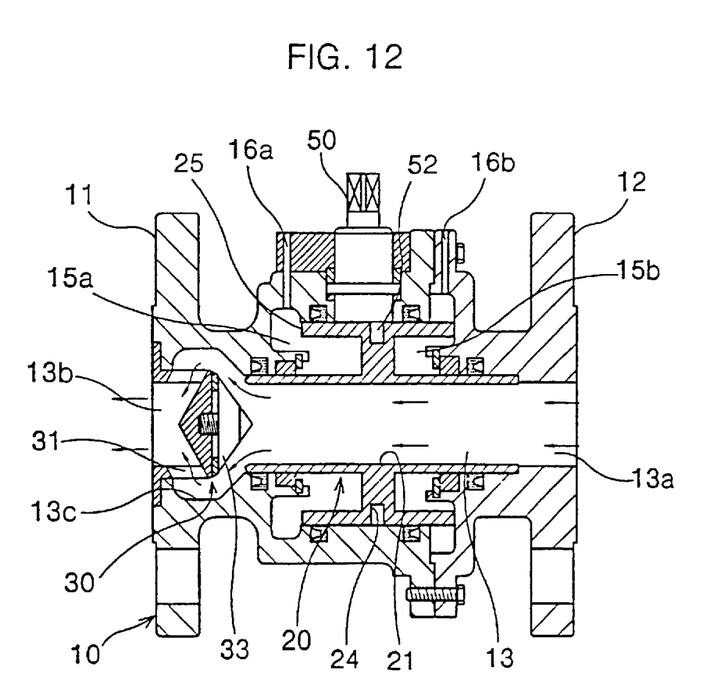
FIG. 12 is a longitudinal-sectioned view of a valve system for fluid pipes in accordance with the fourth embodiment of this invention.

In the fourth embodiment of FIG. 12, the valve system has a simple construction free from both the rotor 40 and the fluid guide rod 45 different from the primary embodiment of FIGS. 3 and 4. The operational effect of this valve system remains the same as that described for the primary embodiment and further explanation is thus not deemed necessary.

In the fifth embodiment of FIGS. 13a to 15, the valve system is designed in that the fluid flow control operation of the valve body 20 with the disc 30 is more stably performed through two steps different from the primary embodiment of FIGS. 3 and 4.

Figure 13A:
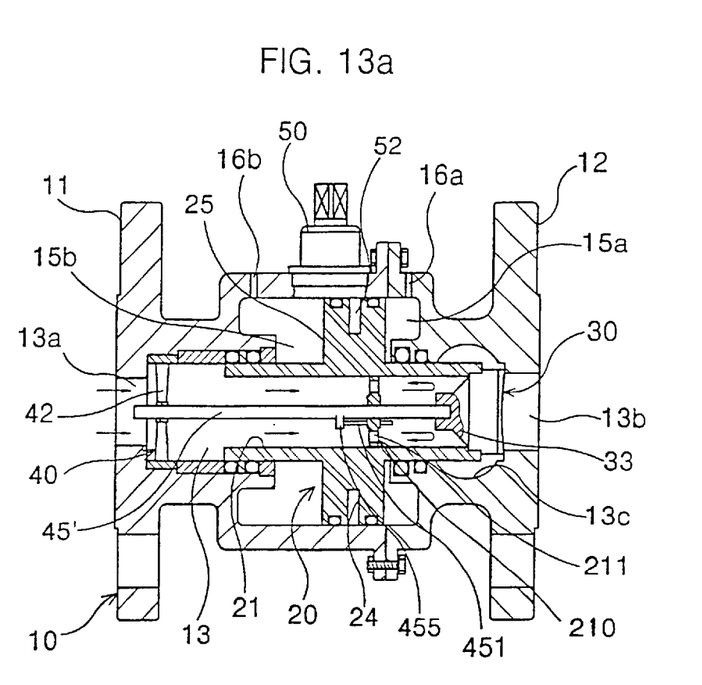
Figure 13B:
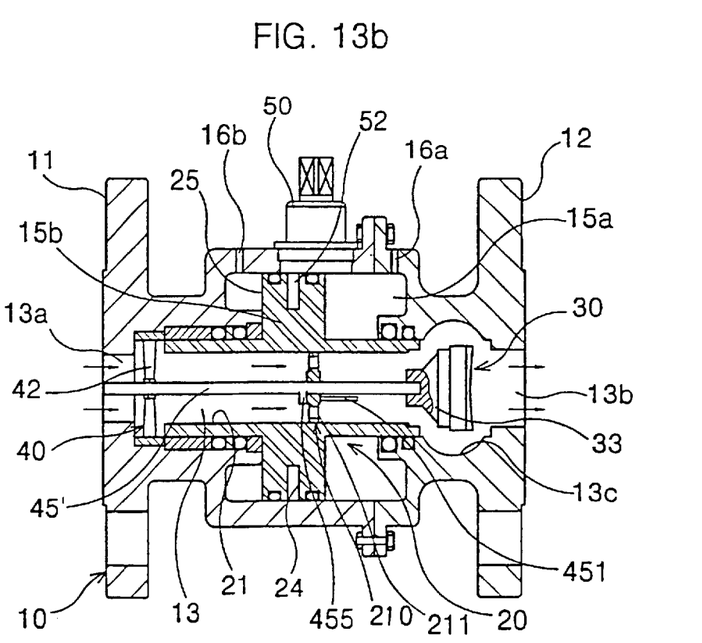

In a detailed description, the first end of the valve body 20 is stepped, thus forming a stepped end 22'. In order to meet the stepped configuration of the valve body 20, the disc 30 is stepped at a surface corresponding to the stepped end 22', thus having a stepped surface 36.

Figure 14:
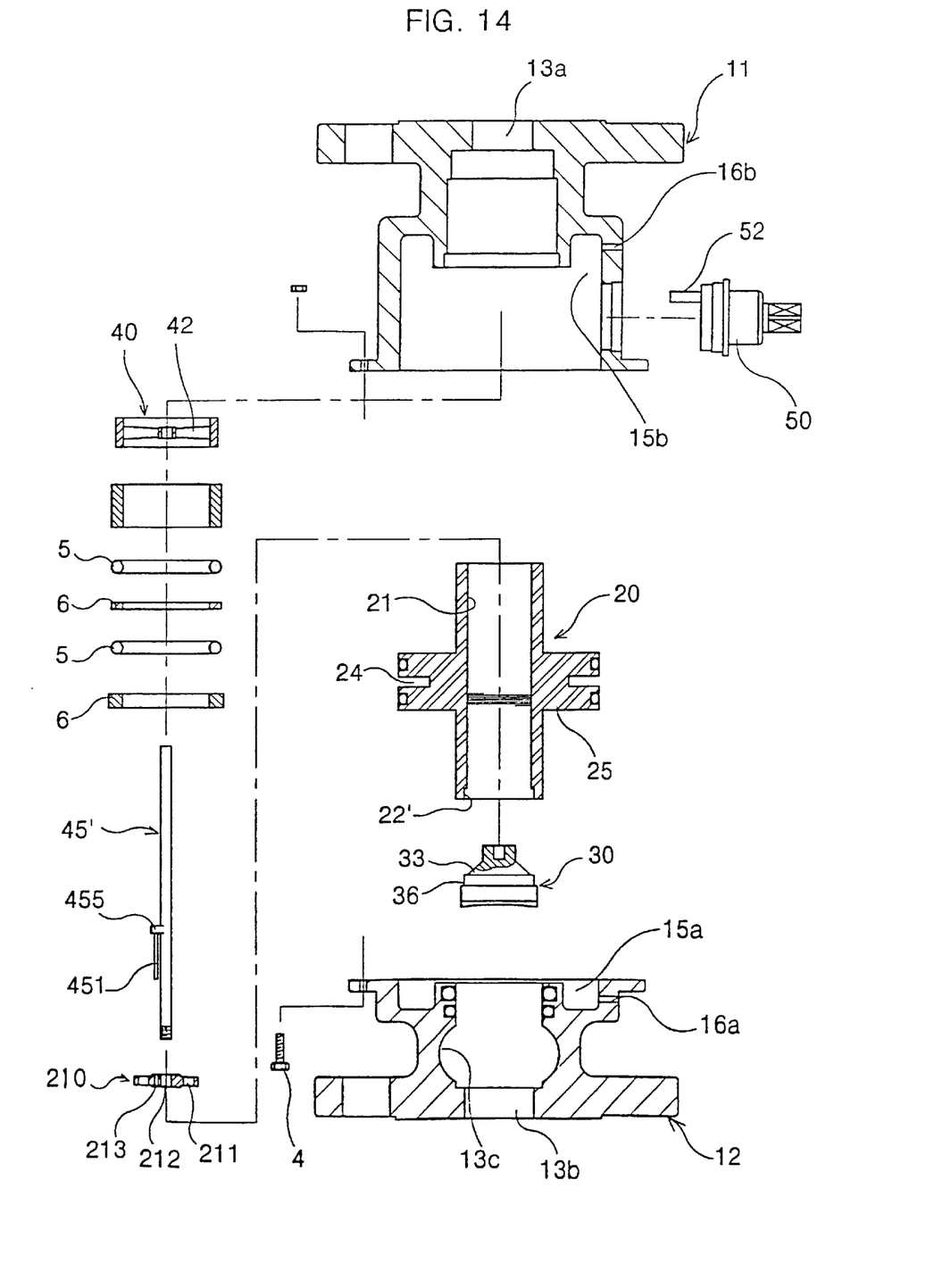
FIG. 14 is an exploded sectional view of the valve system of FIGS. 13a and 13b.
Figure 15:
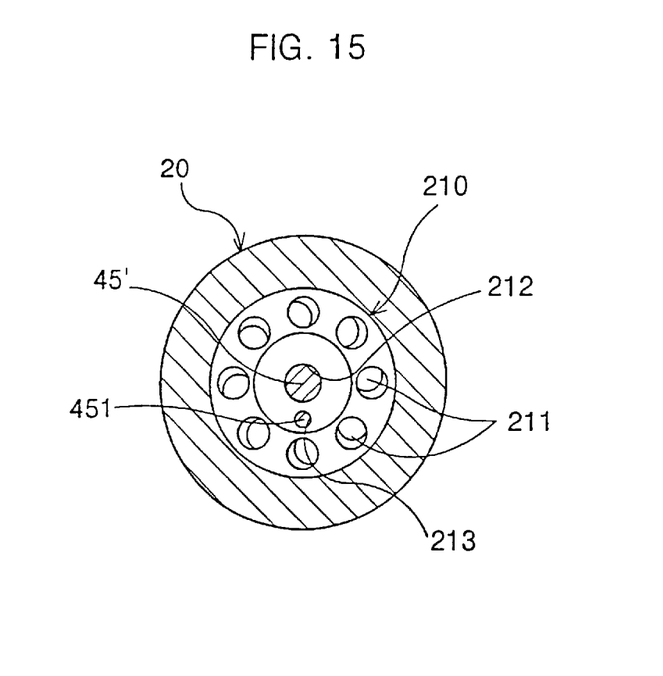
FIG. 15 is a cross-sectioned view of the valve system of FIGS. 13a and 13b, showing a valve support means of the system in more detail.

A support member 210, having a plurality of outwardly inclined twist holes 211 and one support hole 212, is threaded into the cylindrical valve body 20. The twist holes 211 are formed on the outside portion of the support member 210 while being regularly spaced apart from each other at an angular interval. The support hole 212 is formed at the center of the member 210. An actuation rod 45', movably held in the valve system at a first end thereof, axially extends along the center of the passage 13 while being movably fitted into the support hole 212 of the member 210. The actuation rod 45' also engages with a disc 30 at a second end thereof through a screwtype engagement. The support member 210, fixedly set in the valve body 20, is axially movable within the passage 13 along with the disc 30. The actuation rod 45' has a stopper 455 at a middle portion thereof. The support member 210 is thus brought into contact with the stopper 455 during a linear reciprocating action of the valve body 20, and so the stopper 455 allows the actuation rod 45' to be movable along with the valve body 20.

In the drawings, the reference numeral 451 denotes an axial guide pin provided on the actuation rod 45'. The axial guide pin 451 is movably fitted into a guide hole 213 of the support member 210.

The valve system according to the fifth embodiment of the invention is operated as follows.

In order to open the passage 13, pneumatic pressure is injected into the chamber 15a through the port 16a, and so the valve body 20 is primarily moved toward the fluid inlet opening 13a. When the valve body 20 is primarily moved toward the fluid inlet opening 13a, the stepped first end 22' of the valve body 20 is removed from the stepped surface 36 of the disc 30. This is the primary step of opening the passage 13.

In such a case, since the guide pin 451 of the actuation rod 45' passes through the guide hole 213 of the support member 210, the rod 45' is prevented from being undesirably rotated within the passage 13. In addition, as the fluid outlet opening 13b of the valve housing 10 is still closed by the disc 30, fluid is not discharged from the passage 13.

When the valve body 20 is further moved in the same direction, the support member 210 is brought into contact with the stopper 455 of the actuation rod 45'. The actuation rod 45' thus starts to move in the same direction along with the valve body 20. Due to the movement of the actuation rod 45, the disc 30 is spaced apart from the fluid outlet opening 13b, thereby opening the fluid outlet opening 13b. This is the secondary step of opening the passage 13. The fluid is, therefore, discharged from the passage 13 through the fluid outlet opening 13b.

When fluid flows through the passage 13 and is discharged from the passage 13 through the outlet opening 13b, the fluid primarily passes over the vanes 42 of the rotor 40 and secondarily passes through the outwardly inclined twist holes 211 of the support member 210. The fluid is thus centrifugally forced within the passage 13 and more quickly flows through the passage 13. Due to the centrifugal force applied to the fluid, it is possible to minimize the frictional force between the fluid and the fluid guide member 33 of the disc 30 and to easily and smoothly introduce the fluid into the annular guide groove 13c. The fluid is thus more effectively and quickly discharged from the passage 13 through the outlet opening 13b.

When it is necessary to close the passage 13, pneumatic pressure is injected into the second chamber 15b through the port 16b, and so the valve body 20 is primarily moved toward the fluid outlet opening 13b. When the valve body 20 is primarily moved toward the fluid outlet opening 13b, the stepped first end 22' of the valve body 20 is brought into close contact with the stepped surface 36 of the disc 30. This is the primary step of closing the passage 13.

In such a case, since the disc 30 is slightly pushed by the valve body 20, the disc 30 is almost completely free from being undesirably impacted by the valve body 20 when the disc 30 comes into contact with the valve body 20. When the valve body 20 is brought into close contact with the disc 30 as described above, fluid does not flow from the passage 13 into the annular guide groove 13c.

When the valve body 20 is further moved in the same direction, the disc 30 closes the outlet opening 13b. This is the secondary step of closing the outlet opening 13b.

In the above valve system, the passage 13 is opened or closed through two steps, and so the sealing effect of the valve body 20, relative to the disc 30, is improved. In addition, the valve system effectively reduces impact applied from the valve body 20 to the disc 30 during an operation, thus almost completely preventing the disc 30 from damage. However, even when there occurs a slight breakage at the junction between the valve body 20 and the disc 30, the outlet opening 13b is completely closed by the disc 30 since the disc 30 comes into close contact with the outlet opening 13b. Thus, the operation of the valve system is accomplished.

Of course, it should be understood that the valve system of the fifth embodiment may be operated by a valve control lever 50 or 60 in place of pneumatic pressure when necessary.

Figure 16:
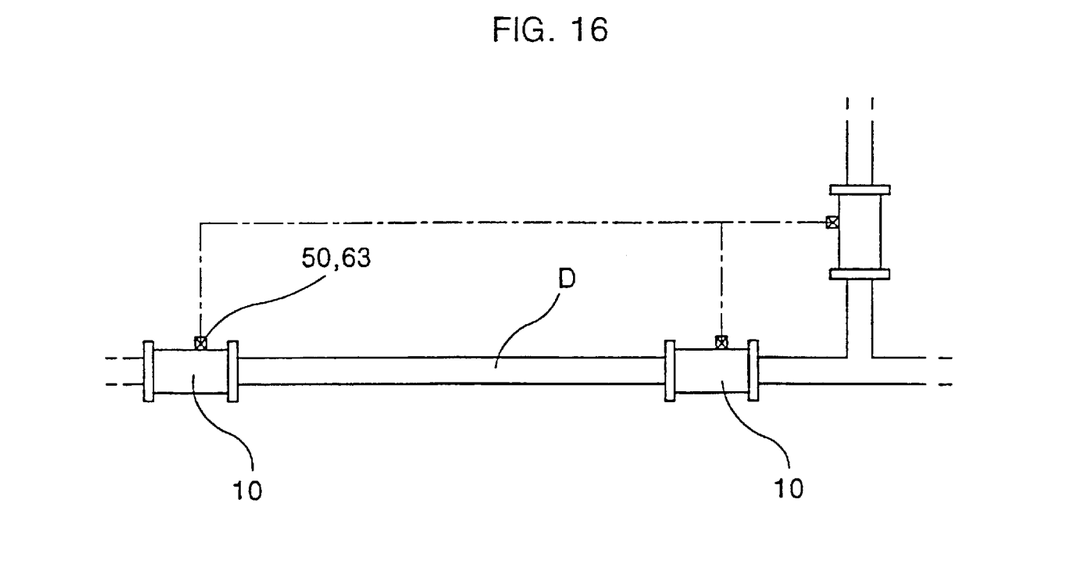
FIG. 16 is a view showing a plurality of valve systems of this invention installed on a fluid pipe.

FIG. 16 is a view, showing a plurality of valve systems of this invention installed on a fluid pipe D. When a plurality of valve systems are mounted to a fluid pipe D as shown in the drawing, it is possible to sense a rotating direction and a rotating angle of the valve control lever 50 or of the rotating shaft 63 of one valve system prior to controlling the remaining valve systems by hydraulic or pneumatic actuators in response to the sensed results. Therefore, it is possible to control the valve systems of one fluid pipe D at the same opening ratio.

Industrial Applicability

As described above, the present invention provides a valve system for fluid pipes. This valve system is designed to be operable using pneumatic pressure or using another means, such as a valve control lever or a fluid pressure, in place of pneumatic pressure and is designed to be controlled easily and precisely. This valve system may be thus freely used in various industrial fields.

The valve system of this invention is also designed to effectively reduce the frictional force between relatively moved parts during an operation of the system, thus being allowed to be easily and smoothly operated. The valve system also allows fluid to smoothly and quickly pass through the system. This improves the operational reliability and market competitiveness of the valve system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A valve system for fluid pipes, comprising:
   two bodies assembled into a single valve housing, with an internal fluid passage being formed along the central axis of said valve housing, said passage having fluid inlet and fluid outlet openings at both ends thereof and also having an annular fluid guide groove at a position inside the fluid outlet opening, said guide groove having a concave surface;
   a cylindrical valve body having an axial fluid passing opening therein and a pressure actuated flange on its external surface, said valve body being axially and movably fitted in said fluid passage so as to be reciprocable within a predetermined range in an axial direction of said valve housing, said valve body being reciprocable by external air pressure acting on either side of said pressure actuated flange of the valve body, said air pressure being introduced to the pressure actuated flange through either one of first and second air injection ports of the valve housing;
   a flanged cylindrical disc provided in the passage at a position within said guide groove, with the valve body being selectively brought into close contact with or being moved away from said disc so as to close or open the passage;
   a rotor having a plurality of vanes, said rotor being provided in the passage within the fluid inlet opening;
   a fluid guide rod axially and centrally extending in the passage from the rotor to the disc; and
   valve control means for selectively moving the valve body toward the fluid inlet or fluid outlet opening of the passage so as to open or close the passage without using air pressure when necessary.

2. The valve system according to claim 1, further comprising:
   a plurality of spring-biased valve support units provided on the valve housing at regularly and angularly spaced positions for movably and concentrically supporting the valve body within the passage, each of said valve support units consisting of:
   a hollow bolt-shaped casing radially threaded into the sidewall of said valve housing, thus being held on the sidewall;
   a valve support plug received in said casing and normally biased by a compression coil spring toward the external surface of said valve body, thus movably and concentrically supporting the valve body within the passage while forming a gap between the valve housing and the valve body; and
   an adjusting bolt movably threaded into an outside end wall of said casing and used for adjusting the spring force of said compression coil spring when necessary.

3. The valve system according to claim 1, wherein said valve control means comprises:
   an annular guide groove formed on a circumferential external surface of the pressure actuated flange of the valve body;
   a valve control lever radially mounted to the sidewall of said valve housing; and
   a valve control bolt axially mounted to an inside end surface of said control lever at an eccentric position, said valve control bolt movably engaging with said annular guide groove of the pressure actuated flange, said valve control bolt thus linearly moving the valve body toward the fluid inlet or fluid outlet opening of the passage so as to open or close the passage when the lever is rotated, with both a linear moving direction and a moving distance of the valve body being determined by a rotating-direction and a rotating angle of the lever.

4. The valve system according to claim 1, wherein said valve control means comprises:
   an annular guide groove formed on a circumferential external surface of the pressure actuated flange of the valve body;
   a longitudinal guide opening axially formed on the sidewall of said valve housing;
   a valve control bolt movably inserted into said longitudinal guide opening until the valve control bolt slidably engages with said annular guide groove of the valve body;
   a valve control lever hinged to said valve control bolt at a first end thereof;
   a rotating shaft rotatably set on the sidewall of the valve housing and fixedly coupled to a second end of said valve control lever, said rotating shaft selectively rotating the valve control lever in either direction while linearly moving the valve control bolt in the same direction under the guide of the longitudinal guide opening, thus linearly moving the valve body within the passage so as to open or close the passage, with both a linear moving direction and a moving distance of the valve body being determined by a rotating direction and a rotating angle of the lever.

5. The valve system according to claim 1, wherein said valve control means operates the valve body using fluid passing through the valve system, said valve control means comprising:
   first and second fluid pressure lines extending from a main pressure line of said fluid inlet opening of the passage to the first and second air injection ports of the valve housing, respectively, with a three-way valve being provided at the junction between the three pressure lines, said first and second fluid pressure lines being selectively opened under the control of the three-way valve, thus allowing fluid pressure from the main pressure line to act on an associated side of the pressure actuated flange of the valve body and thereby moving the valve body within the passage.

6. A valve system for fluid pipes, comprising:
   two bodies assembled into a single valve housing, with an internal fluid passage being formed along the central axis of said valve housing, said passage having fluid inlet and fluid outlet openings at both ends thereof and also having an annular fluid guide groove at a position inside the fluid outlet opening, said guide groove having a concave surface;
   a cylindrical valve body having an axial fluid passing opening therein and a pressure actuated flange on its external surface, said valve body being axially and movably fitted in said fluid passage so as to be reciprocable within a predetermined range in an axial direction of said valve housing, said valve body being reciprocable by external air pressure acting on either side of said pressure actuated flange of the valve body, said air pressure being introduced to the pressure actuated flange through either one of first and second air injection ports of the valve housing;

a flanged cylindrical disc provided in the passage at a position within said guide groove, with the valve body being selectively brought into close contact with or being moved away from said disc so as to close or open the passage;

a support member threaded into said fluid passing opening of the valve body, with a plurality of outwardly inclined twist holes being regularly formed on an outside portion of the support member while being angularly spaced apart from each other and one support hole being formed at the center of said support member;

an actuation rod axially and movably extending along the center of said passage while being movably fitted into the support hole of said support member, said actuation rod fixedly engaging with said disc at one end thereof, thus being axially movable along with the disc within the passage; and a stopper formed at a middle portion of said actuation rod, said stopper being selectively brought into contact with the support member during a linear moving action of the valve body and allowing the actuation rod to be movable along with the valve body, whereby said disc is operated in conjunction with the valve body through primary and secondary steps while opening or closing the fluid outlet opening of said passage.

\* \* \* \* \*